US007873581B2

(12) United States Patent
Flickinger et al.

(10) Patent No.: US 7,873,581 B2
(45) Date of Patent: Jan. 18, 2011

(54) METHOD AND SYSTEM FOR DETERMINING THE RELIABILITY OF A DC MOTOR SYSTEM

(75) Inventors: Greg L. Flickinger, Pittsburgh, PA (US); Gary J. Chmiel, Ballston Spa, NY (US); Hunt A. Sutherland, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 11/872,366

(22) Filed: Oct. 15, 2007

(65) Prior Publication Data

US 2009/0096406 A1 Apr. 16, 2009

(51) Int. Cl.
*G06F 15/18* (2006.01)
*G06G 7/00* (2006.01)
(52) U.S. Cl. .......................................... 706/7
(58) Field of Classification Search ....................... 706/7
See application file for complete search history.

(56) References Cited

U.S. PATENT DOCUMENTS

| 7,254,514 | B2 | 8/2007 | House et al. |
| 2007/0021966 | A1 | 1/2007 | Ellefson |

FOREIGN PATENT DOCUMENTS

| EP | 1630633 A | 3/2006 |
| GB | 2426090 A | 11/2006 |
| JP | 2004265449 A | 9/2004 |
| JP | 2006141088 A | 6/2006 |

*Primary Examiner*—Michael Holmes
(74) *Attorney, Agent, or Firm*—Dale J. Davis; Ernest G. Cusick; Frank A. Landgraff

(57) ABSTRACT

A method and system for determining the reliability and a remaining time before failure for a DC motor system is provided. The method and system may determine the reliability and a remaining time before failure with a statistical confidence. The method and system may includes acquiring historical motor data, obtaining operational data, performing failure analysis, developing a causal network, and performing an integrated causal network and reliability analysis of the DC motor system.

20 Claims, 4 Drawing Sheets

METHOD AND SYSTEM FOR DETERMINING THE RELIABILITY OF A DC MOTOR SYSTEM

"This application is related to commonly-assigned U.S. patent application Ser. No. 11/872,211 filed Oct. 15, 2007."

BACKGROUND OF THE INVENTION

The present invention relates to the operation of a DC motor system, and more particularly to a method and system for determining, with an ascertained statistical confidence, the reliability of a component with the DC motor system.

Acquisition of accurate information concerning the running condition, status, and performance of DC motor systems, such as, but not limiting of, electric motors used in industrial manufacturing processes, power generation systems, or the like; is often crucial in maintaining successful operation of such systems. Consequently, considerable efforts are often expended to develop and improve upon existing methods and systems used for assessing the operation and performance of electric motors and coil devices in such systems. Robust methods of inspection are often desired for such critical process motors, since inoperability of a motor may adversely impact revenue generation.

Robust processes for the inspection and predictive maintenance of DC motor systems usually involve monitoring a variety of operational indicators to detect an impending failure and may also be used for determining reliability. Conventionally, one or more indicators are monitored over time and used to trigger a maintenance outage/recommendation when the value of a monitored parameter exceeds a predetermined threshold. The contemporary technological trend is to automate the inspection process by affixing a variety of sensors and transducers to the DC motor to continuously collect information through either off-line monitoring or on-line monitoring techniques. Operational indicators for an operating motor may then be tracked continuously and an alarm may be immediately triggered if a predetermined threshold value for a particular indicator is exceeded. For example, but not limiting of, vibration amplitude or spectral data that exceeds or drifts from a predetermined range or value can be used to activate an alarm to notify the equipment operator that a particular type of failure mode is imminent.

The use of motor operational indicator data as a failure predictive tool and to assess motor health has been explored to some extent in the past by various investigators. Different DC motor system indicators may sense vibration, temperature, and speed for this purpose and may include at least one device integrated with the DC motor for detecting issues with the commutator, arcing, and/or sparking issues, etc.

In general, service and repair information acquired as a result of previous inspections and routine maintenance of motor equipment is not compiled for the purpose of performing predictive/prognostic maintenance or conducting a comprehensive analysis of motor health. Conventionally, a DC motor system expert/specialist simply assesses available historical information and then formulates a maintenance recommendation based on obvious trends and personal experience. A decision to repair or perform maintenance is commonly based on an estimate of the reliability developed primarily from the subjective judgment of the expert. In other instances, preventive maintenance is based solely on the number of hours of motor operation or the time since the last maintenance outage, rather than on any condition-based test results.

There are a few drawbacks with the currently known methods of monitoring and diagnosing the reliability of a DC motor system. The conventional systems typically target only data that may represent an imminent failure and do not provide a quantitative determination of remaining motor life or motor reliability. Some conventional systems provide only a general warning of imminent motor failure based on the detection of an alarm condition from a single monitored indicator. These systems may not provide an assessment of motor reliability, nor do they provide an estimate of the operating time remaining until a repair will be needed.

For the foregoing reasons, there is a need for a method and system for determining the reliability of a DC motor system. The method and system should receive a plurality of operating data on the components of the DC motor system. The method and system should also analyze motor data and determine the motor reliability.

BRIEF DESCRIPTION OF THE INVENTION

In accordance with an embodiment of the present invention, a method of determining reliability of at least one DC motor system on a site, the method comprising: providing at least one DC condition forecaster, wherein the at least one DC condition forecaster is located on the site having the at least one DC motor system; acquiring historical motor data corresponding to the at least one DC motor system from at least one historical database; wherein the historical motor data comprises data representing an armature current; a field current; a field temperature, a bearing temperature; vibration; speed; commutator arcing; and combinations thereof; receiving operational indicator data from at least one sensor of the DC motor system; performing at least one reliability analysis based on a composite of reliability probability distributions corresponding to predetermined sub-populations of historical failure causes relating to the at least one DC motor system; developing at least one causal network for modeling reliability of a plurality of DC motor systems, including the at least one DC motor system, and assessing a combination of at least one DC motor system component based on the causal network; performing at least one integrated causal network and reliability analysis of the at least one DC motor system, wherein results from the at least one analysis are integrated with results from the step of assessing the at least one DC motor system component condition based on the at least one causal network to compute a quantitative value for an estimated time remaining before the failure; and generating at least one operability curve of the DC motor system based in part on the results of the step of performing the at least one integrated causal network and reliability analysis of the at least one DC motor system.

In accordance with an alternate embodiment of the present invention, a method of determining reliability of at least one DC motor system on a site, the method comprising: providing at least one DC condition forecaster, wherein the at least one DC condition forecaster is located on the site having the at least one DC motor system; acquiring historical motor data corresponding to the at least one DC motor system from at least one historical database; wherein the historical motor data comprises data representing an armature current; a field current; a field temperature; a bearing temperature; vibration; speed; commutator arcing; and combinations thereof; receiving operational indicator data from at least one sensor of the DC motor system; performing at least one reliability analysis based on a composite of reliability probability distributions corresponding to predetermined sub-populations of historical failure causes relating to the at least one DC motor system;

developing at least one causal network for modeling reliability of a plurality of DC motor systems, including the at least one DC motor system, and assessing a combination of at least one DC motor system component based on the causal network; wherein the causal network utilizes fuzzy logic; performing at least one integrated causal network and reliability analysis of the at least one DC motor system, wherein results from the at least one analysis are integrated with results of assessing the at least one DC motor system component condition based on the at least one causal network to compute a quantitative value for an estimated time remaining before the failure; and modeling a failure rate of a system component using a Weibull probability distribution function; and generating at least one operability curve of the DC motor system based in part on the results of the step of performing the at least one integrated causal network and reliability analysis of the at least one DC motor system.

In accordance with another alternate embodiment of the present invention, a system for determining reliability of at least one DC motor system on a site, the system comprising: at least one DC condition forecaster, wherein the at least one DC condition forecaster is located on the site having the at least one DC motor system; means for acquiring historical motor data corresponding to the at least one DC motor system from at least one historical database; at least one sensor of the DC motor system; wherein the at least one sensor provides operational indicator data; means for performing at least one reliability analysis based on a composite of reliability probability distributions corresponding to predetermined subpopulations of historical failure causes relating to the at least one DC motor system; means for developing at least one causal network for modeling reliability of a plurality of DC motor systems, including the at least one DC motor system; means for assessing a combination of at least one DC motor system component based on the causal network; and wherein the at least one DC condition forecaster: performs at least one integrated causal network and reliability analysis of the at least one DC motor system, wherein results from the at least one analysis are integrated with results from the step of assessing the at least one DC motor system component condition based on the at least one causal network to compute a quantitative value for an estimated time remaining before the failure; and generates at least one operability curve of the at least one DC motor system based in part on the results of the step of performing the at least one integrated causal network and reliability analysis of the at least one DC motor system.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

An embodiment of the present invention takes the form of an application and process that may have the technical effect of determining the reliability of at least one DC motor system. The reliability determination may include forecasting a failure mode, which may cause the DC motor system to stop normal operation. Determining the reliability of the at least one DC motor system may include the determining an estimated remaining time before failure of at least one component of the DC motor system.

The present invention can be applied to DC motor systems used in a variety of applications, including: industrial processes, powerplant processes; and combinations thereof.

A DC motor system may include at least one DC motor and at least one of the following devices: sensors, transmitters, temperature elements, or the like, and combinations thereof which may monitor the DC motor. For example, but not limiting of, the DC motor system may include at least one sensor for detecting at least one of the following problems generally specific to a DC motor system: commutator issues, arcing, sparking, and combinations thereof.

A DC motor system may have a plurality of operational indicators corresponding to the sensor, transmitter, temperature element, or the like, which may be part of the DC motor system, as described. The operational indicators may be used for determining the reliability of the DC motor. The operational indicators may include, for example, but not limiting of data representing: an armature current; a field current; a field temperature; a bearing temperature; vibration; speed; commutator arcing; and combinations thereof. For example, but not limiting of, the name of the operational indicator representing a vibration level on the DC motor may be "Vib_1". The corresponding operating data may provide values for Vib_1 over a specified range of time, which may be received by the at least one DC condition forecaster.

Figure 1:
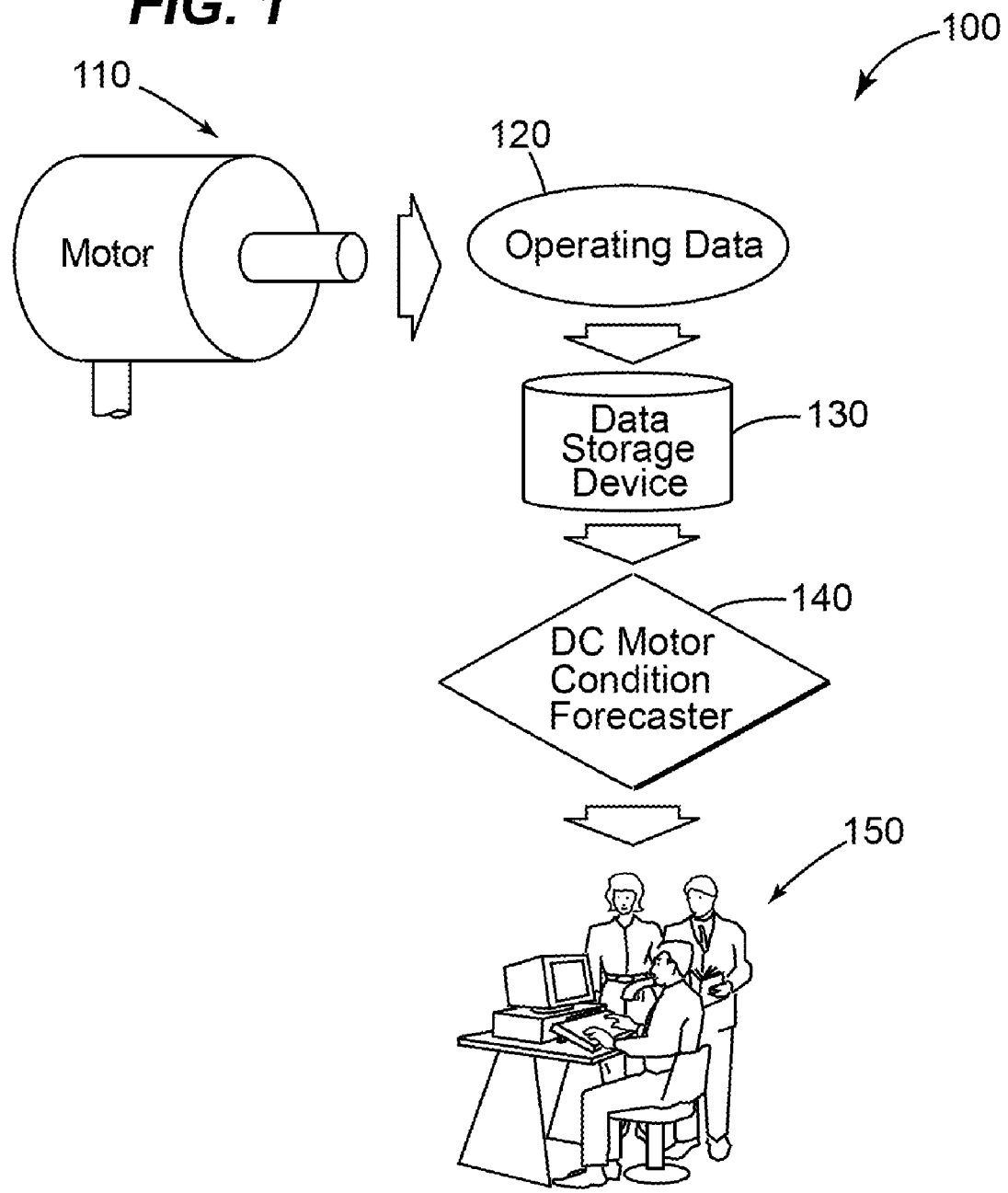
FIG. 1 is a schematic illustrating the environment in which an embodiment of the present invention operates.

Referring now to the Figures, where the various numbers represent like elements throughout the several views. FIG. 1 is a schematic illustrating the environment in which an embodiment of the present invention operates. FIG. 1 illustrates a site 100 comprising a DC motor system 110; a plurality of operating data 120; a data storage device 130; a DC condition forecaster 140; and a workstation 150.

The site 100 may comprise at least one control system or the like (not illustrated) which may receive the plurality of operating data 120 from the DC motor system 110. The plurality of operating data 120 may comprise the operational indicators (previously discussed), which may be used in evaluating the reliability of the DC motor system 110.

The plurality of operating data 120 may be transmitted to at least one data storage device 130, which may, inter alia, collect, process, and store, the plurality of operating data 120. The data storage device 130 may be located on the site 100.

In an embodiment of the present invention, a data storage device 130 may transmit the plurality of operating data 120 to at least one DC motor condition forecaster 140, which may be approximately located at the power plant site 100.

The DC motor condition forecaster 140 may predict the reliability of the at least one component of the DC motor system 110, which may include determine an estimated remaining time before failure of a component of the DC motor system 110.

The results of the assessment, or the like, performed by the DC motor condition forecaster 140 may be viewed on the workstation 150. The results may include, for example, but not limiting of, a moving bar graph; changing data odometers; or an operability curve or the like; and combinations thereof.

Industrial and power generation motors are often supplied and installed with operational indicators to indicate running conditions for the purpose of trending operational indictor data and planning maintenance procedures. Operational indicators may be configured to provide online and/or offline testing of an electric motor. Online testing has advantages over offline testing due to an ease of data acquisition and an ability to avoid downtime of the electric motor. Operational indicators used for online testing are configured to acquire operational indicators of the DC motor 110. The operational indicators may include, for example, but not limiting of, voltage, armature current, vibration, speed, and commutator arcing.

A method has been designed for forecasting the reliability, including a failure mode, of the DC motor system 110, based on sensor inputs including the operational indicators. The method may incorporate a large database of inspection information and industry standard data utilized for a probabilistic analysis of the sensor inputs and a causal network, which may incorporate, for example, but not limiting of, fuzzy logic, employed to relate various inputs with potential failure modes of at least one component of the DC motor system 110.

Engineering systems analysis has been successfully applied to reliability calculations in related fields such as electronic devices. Mean-time-to-Failure (MTTF) data are collected on various components of a system. A designer then calculates system reliability based upon reliability block diagrams and produces an overall system reliability distribution, R. The dependence of R is a function of individual failure rates of the system, $\lambda$, as described below:

$$R = f(\lambda_1, \lambda_2, \ldots \lambda_n)$$

Each of the individual $\lambda$, describes a failure rate of a corresponding component of the system. Each component of the system experiences a useful life that may be assessed and used in determining the reliability of the at least one DC motor system 110.

If failure rates of multiple components are independent, then a multiplicative relationship can be used to calculate system reliability:

$$p(\lambda) = \prod_{i=1}^{k} f(\lambda_i)$$

Otherwise a simulation of a joint, dependent probability density function (pdf) is required. The method is to randomly sample a joint pdf, compute a reliability for that run and then construct an overall reliability distribution function based on an accumulation of runs. Component life is distributed according to a probability density function and may take the from of an exponential, log-normal or Weibull distribution. The Weibull distribution is most useful due to its flexible shape of the distribution with shape and scale parameters, $\beta$ and, $\eta$ where (t) is a time range:

$$f(t) = \frac{\beta}{\eta} \left(\frac{t}{\eta}\right)^{\beta-1} e^{-\left(\frac{t}{\eta}\right)^{\beta}}$$

Data for the individual Weibull distributions described by the shape and scale parameters, $\beta$ and, $\eta$ can be extracted from a database compiled from cataloged root cause failures for a variety of components. The indicators can be used to accelerate the scale, $\eta_f$, of the Weibull distribution through influence relationship such as an Arrhenius equation. An acceleration factor (Af) using the Arrhenius equation may be given by:

$$Af = \exp(\text{act}E/V_n - \text{act}E/V_a).$$

Here the activation energy (actE) may be set to 0.1, $V_n$ may be a constant set to 1, and $$V_a = 1/E[\text{indicators}]$$

Where a function E is used to aggregate the number and duration of the indicators over time. In an embodiment of the present invention, a regression may be performed over the prior history of the data. However other methods such as, but not limiting of, a fading model that reduces the effect of the indicators over time when not present. The activation energy and $V_n$ constants may be re-calibrated when there is sufficient failure data to do so. When there is no data to predict a failure then the acceleration factor (Af) may be set to 1. The acceleration factor reduces the scale parameter in the life calculation to:

$$\eta_f = \eta/Af$$

This method, because or the simplicity, may be used to accelerate the fife calculation. However, other methods may be used to accelerate the life calculation equation.

Conditional probabilities, $f(A(t)|B(t))$ of motor reliability are determined through a collection of field data of the system. In general, a conditional probability refers to the probability of event B happening, given that event A has already occurred. The collection of field data is accomplished, for example, but not limiting of, using either online or offline methods of data collection. The conditional probabilities may be used when constructing the causal network assessment (fuzzy model for example, but not limiting thereof).

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a computer or entirely on the computer. In the latter scenario, the computer may be connected to the user's computer through a local area network (LAN) or a wide area network (WAN), or the connection may be made to an external computer (for example, but not limiting of, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
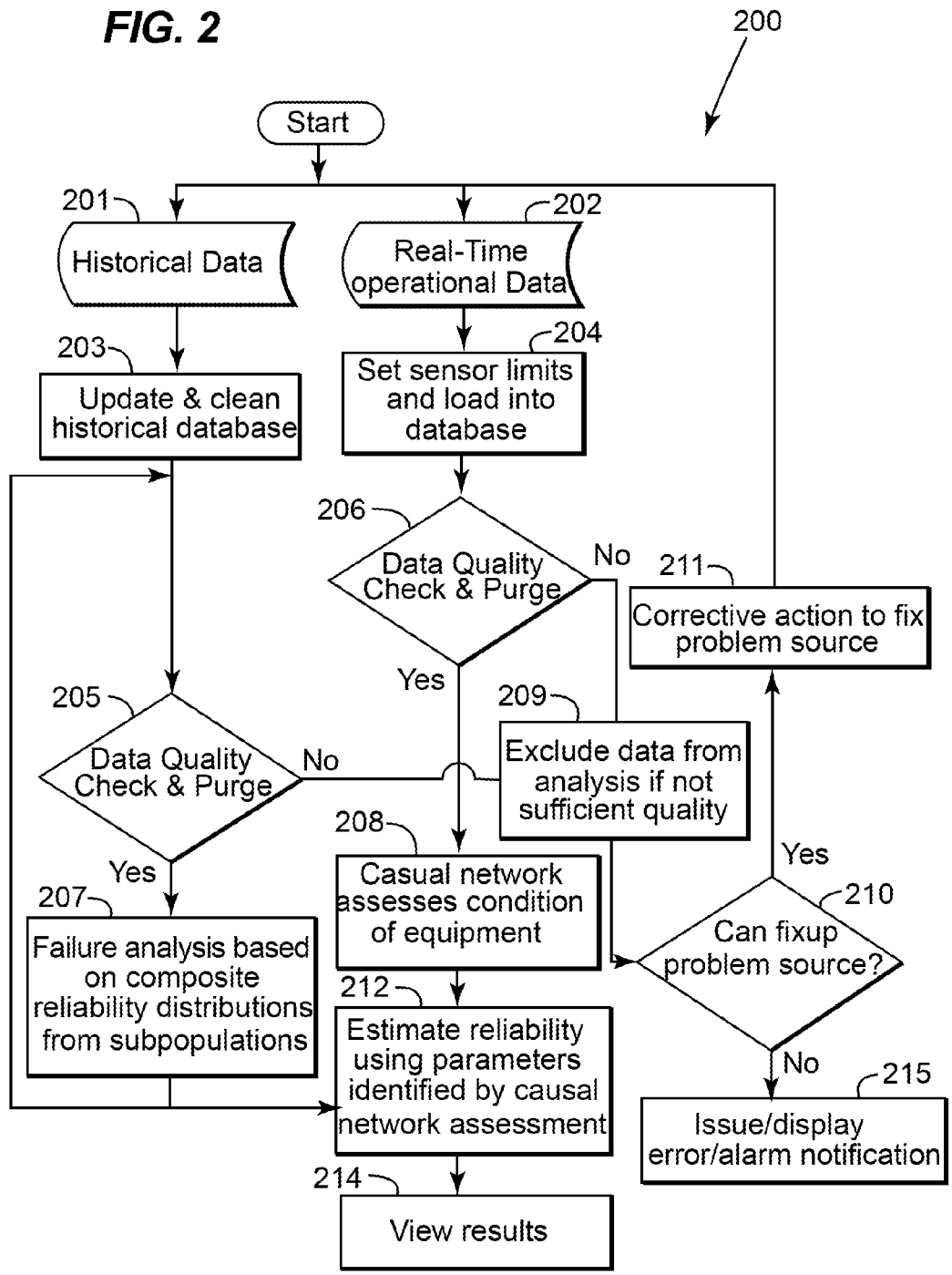
FIG. 2 is a high-level flow diagram illustrating a method utilized by a DC condition forecaster in accordance with an embodiment of the present invention.

FIG. 2 is a high-level flow diagram illustrating a method 200 utilized a DC motor condition forecaster 140 in accordance with an embodiment of the present invention.

The method 200 initially involves receiving and organizing historical motor repair data into a database in step 201. The historical motor repair data acquired in step 201 corresponds to a same or similar motor systems. In step 203, the database is updated and purged to remove any erroneous or irrelevant data. In step 205, data quality checking and purging is performed.

If the method 200 determines that the data quality is acceptable in step 205, then in step 207 at least one failure analysis for the DC motor system 110 may be performed based on a composite of reliability distributions corresponding to various sub-populations of electrical, mechanical, environmental, and systemic fault issues/failure modes; then the method 200 may proceed to step 212 where an estimate of reliability using indicators identified by causal network assessment may be performed, as discussed below. The various sub-populations may include for example, but not limiting of data representing an armature current; a field current; a field temperature; a bearing temperature; vibration, speed; commutator arcing; and combinations thereof; relating to the type DC motor system 110.

The method 200 may proceed to step 209 if the data quality checking and purging performed in step 205 has discovered errors. In step 209 any data that does not meet a predetermined quality criterion may be excluded from use in the current analysis.

The method 200, in step 210, may determine if the problem source of the excluded data can be fixed. If the problem source of the excluded data may be fixed, then the method 200 may proceed to step 211; otherwise the method 200 may proceed to step 215. In step 211, the method 200 may perform at least one corrective action to fix the problem source of the excluded data. In step 215, the method 200, may provided a notification, or the like, of the issue or error with the excluded data to the user.

The method 200 may also execute a series of concurrent steps (202-208), while executing steps 201-207. In step 202, the method 200 may monitor and acquire the current operational data 120, in real-time, from the operational indicators of the DC motor system 110 for which a reliability and time-to-failure assessment may be desired. The current operational indicator data 120 may also be compiled in another database in step 202 (or integrated into the historical database) and continually updated.

In step 204, the method 200 may set load into the database sensor limits. Specific data ranges and limits or calculated metrics for the particular DC motor system 110 operational indicators may also be set and monitored in the database and used, for example, but not limiting of, to trigger a notification/alarm condition when appropriate in step 204.

The method 200 may also perform data quality checks and purging in step 206, similar to step 205. If step 206 determines that the data meets a predetermined quality criterion, then the method 200 may proceed to step 208; otherwise the method 200 may proceed to step 209, as discussed and whereby after step 209 is performed the method 200 may then revert to step 202.

In step 208, the method 200 may provide at least one casual network, which may assess the condition of the components of the DC motor system 110. The causal network may develop at least one condition used for developing failure modes. The causal network may utilize fuzzy logic for assessing the condition of the components of the DC motor system 110.

In step 212, the method 200 may estimate reliability using indicators identified by the causal network assessment of step 208. Here, the method 200 may integrate/combine the results of reliability analysis from the historical data, correlate the results from the casual network assessment of step 208, and then develop a statistically reliable prediction of an estimated time remaining before failure. Step 212 may perform a method similar to the aforementioned; integrating data from step 207 instead of step 208.

In an embodiment of the present invention, implementation of the method 200 may include computing the Maximum Likelihood Estimate (MLE) of Weibull reliability indicators for the DC motor system 110 and/or the equipment components identified by the causal network.

In step 214, the method 200 may allow a user to view results of the analysis discussed above. Computed statistical estimations of system reliability and an estimated time remaining before failure may be displayed using conventional computer I/O interface/display devices. In an embodiment of the present invention, the estimated time remaining before failure and computed reliability are displayed using dynamic graphical images such as, but not limited to, a moving bar graphs and changing data odometers, or the like. In an embodiment of the present invention, the method 200, in step 214, may generate an operability curve (not illustrated), or the like, which a user may view on the workstation 150. The operability curve may provide a user with guidance on how to safely operate the DC motor system 110.

In general, the various data validation and calibration steps (e.g., 205 and 206) may be avoided however, use of such may improve both the failure analysis, and the causal networks relied upon for developing statistical predictions of reliability.

Figure 3:
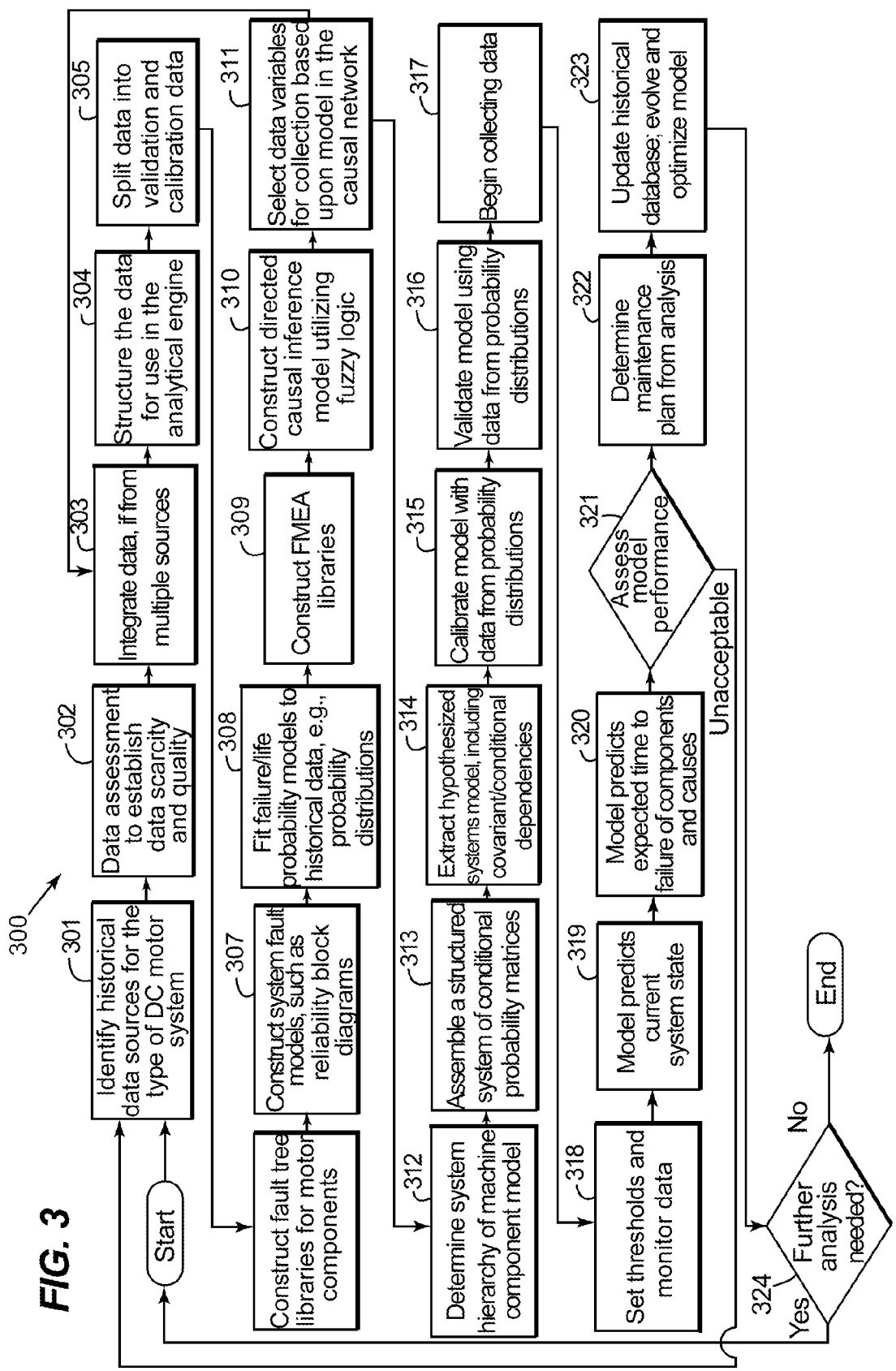
FIG. 3 is a detailed flow diagram illustrating the method of FIG. 2 in accordance with an embodiment of the present invention.

FIG. 3 is a detailed flow diagram illustrating a method 300, similar to the method 200 of FIG. 2 in accordance with an embodiment of the present invention. FIG. 3 provides a detailed procedural flow diagram that illustrates the method 300 for determining DC motor reliability and predicting time-to-next-repair (or failure) that may be used by the condition forecaster 140.

In step 301, the method 300 may identify historical data sources for the type of DC motor system 110. In step 301, for example, but not limiting of, historical test data, and/or failure analysis records acquired over a period of time, for the DC motor system 110 being evaluated, may be identified and a historical database of part/component failure rate data may be compiled. The historical database may be maintained in the data storage device 130. The historical database may also be updated by at least one manual data transfer means using, for example, but not limiting of, removable storage media (e.g., CD ROM, compact flash, or the like).

The method 300 in steps 302 through 311 may represent general data preprocessing steps performed to structure and combine historical motor data that may be later used for reliability computations. In step 302, the method 300 may perform a data assessment to determine scarcity and quality of the data received in step 301. In step 303, the method 300 may integrate the data if acquired from multiple sources. Next, in step 304, the method 300 may structure the data for use by the analytical engine. Next, in step 305, the method 300 may split data into validation and calibration type data. Next, in step 306, the method 300 may construct system fault tree libraries for the components of the DC motor system 110. Next, in step 307, the method 300 may construct system fault models (such as, but not limiting of, reliability block diagrams). Next, in step 308, the method 300 may fit the failure/life-span probability models to the historical data (e.g., using for example, but not limiting of, a probability distribution, or the like). Next, in step 309, the method 300 may construct a plurality of libraries, such as but not limited to, Failure Modes and Effects Analysis (FMEA) libraries to identify common failure modes. Next, in step 310, the method 300 may construct directed causal inference models, networks or the like; utilizing, for example, but not limiting of, fuzzy logic. The models may be used to compute conditional probability of motor component degradation. Next, in step 311, the method 300 may select data variables for collection based upon model in the causal network.

Steps 312 through 314, of the method 300, illustrate procedural steps for segmenting the DC motor system 110 by component and establishing dependencies within the causal network. For example, but not limiting of, a system hierarchy of a machine component model may be determined in step 312; a structured system of conditional probability matrices may be assembled in step 313; and a hypothesized systems model including covariant/conditional dependencies may be then extracted in step 314.

Next, in steps 315 and 316, the systems model, discussed in steps 312-314, may be properly calibrated with respect to the DC motor system 110 under investigation. For example, but not limiting of, the systems model may be calibrated with data from probability distributions in step 315; and then validated using data from probability distributions in step 316.

In step 317, the method 300 may begin collecting data. Step 317 may represent the initiation of a procedural stage of field data collection from the operational indicators that may be attached to the DC motor system 110 under analysis. At this point, current operational/test data may be obtained on the particular DC motor system 110 under analysis. This field data may be collected from the operational indicators (previously discussed) on the DC motor system 110 or other conventional means at the site 100.

In step 318, the method 300 may set thresholds and monitor data. In step 318, the DC motor system 110 thresholds and alarm limits may be constructed/set-up and the field data from the motor system may be monitored. If the thresholds or alarm limits are exceeded some form of real-time feedback, such as, but not limiting of, an alarm notification may be provided.

In step 319, the method 300 may predict a current "state" of the DC motor system 110. As illustrated in step 319, the state of the DC motor system 110 may be predicted based on the causal network, the thresholds, and the monitor data acquired in step 318.

In step 320, the method 300 may use the system model to predict expected time-to-failure of the various DC motor system 110 components. Step 320 may also determine the cause of the predicted failures. In an embodiment of the present invention, the system model may also predict for example, but not limiting of, covariant/conditional dependencies.

Next, as illustrated in steps 321 and 322, decision points may be reached whereby an operator may need to evaluate: alarm conditions; assess the model's performance; and/or decided on whether repair or replacement of a component is recommend. If an operator determines in step 321 that the assessed performance of the model yields inaccuracies, then the method 300 may proceed to step 324; otherwise the method 300 may proceed to step 322. In step 322, the method 300 may determine a maintenance plan from the analysis. Here, for example, but not limiting of, an operator may develop the maintenance plan.

Next, steps 323 and 324 may illustrate further steps, which may be taken to improve the predicting capabilities of the causal networks and optimize the reliability model. In step 323, the method 300, may update the historical database with acquired data, evolve, and optimize the model to increase accuracy. In step 324, the method 300 may determine whether further analysis may be required. In step 324, if an operator determines that the system model may be inaccurate or unrealistic, the whole method 300 may be re-initiated. If an operator determines that the method 300 may need to be re-initiated then the method 300 may revert to step 301; otherwise the method 300 has ended.

Figure 4:
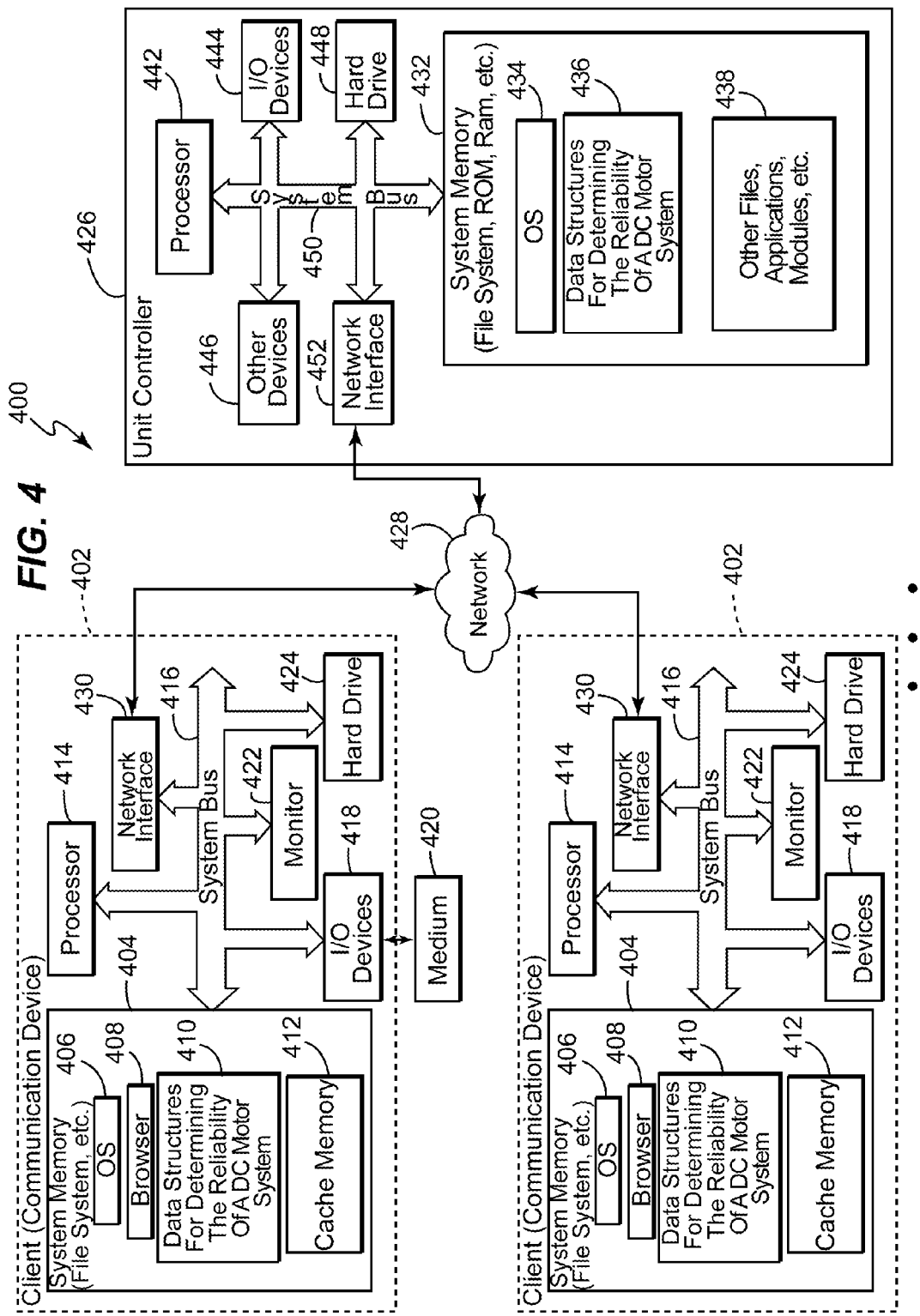
FIG. 4 is a block diagram of an exemplary system for determining the reliability of a DC motor system in accordance with an embodiment of the present invention.

FIG. 4 is a block diagram of an exemplary system 400 for determining the reliability of a DC motor system 110 in accordance with an embodiment of the present invention. The elements of the method 300 may be embodied in and performed by the system 400. The system 400 may include one or more user or client communication devices 402 or similar systems or devices (two are illustrated in FIG. 4). Each communication device 402 may be for example, but not limited to, a computer system, a personal digital assistant, a cellular phone, or similar device capable of sending and receiving an electronic message.

The communication device 402 may include a system memory 404 or local file system. The system memory 404 may include for example, but is not limited to, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code for determining the reliability of a DC motor system 110 that may be similar or include elements of the method 300 in FIG. 3.

The system memory 404 may further include a template cache memory 412, which may be used in conjunction with the method 300 in FIG. 3 for determining the reliability of a DC motor system 110.

The communication device 402 may also include a processor or processing unit 414 to control operations of the other components of the communication device 402. The operating system 406, browser 408, and data structures 410 may be operable on the processing unit 414. The processing unit 414 may be coupled to the memory system 404 and other components of the communication device 402 by a system bus 416.

The communication device 402 may also include multiple input devices (I/O), output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to predict the remaining life of a DC motor system 110. The I/O devices 418 may include a keyboard and computer pointing device or the like to perform the operations discussed herein.

The I/O devices 418 may also include for example, but are not limited to, disk drives, optical, mechanical, magnetic, or infrared input/output devices, modems or the like. The I/O devices 418 may be used to access a storage medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may permit the user to interface with the communication device 402.

The communication device 402 may also include a hard drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication device 402 may communicate with a server 426 and may access other servers or other communication devices similar to communication device 402 via a network 428. The system bus 416 may be coupled to the network 428 by a network interface 430. The network interface 430 may be a modem, Ethernet card, router, gateway, or the like for coupling to the network 428. The coupling may be a wired or wireless connection. The network 428 may be the Internet, private network, an intranet, or the like.

The server 426 may also include a system memory 432 that may include a file system, ROM, RAM, and the like. The system memory 432 may include an operating system 434 similar to operating system 406 in communication devices 402. The system memory 432 may also include data structures 436 for determining the reliability of a DC motor system 110. The data structures 436 may include operations similar to those described with respect to the method 300 for predicting the remaining life of a DC motor system 110. The server system memory 432 may also include other files 438, applications, modules, and the like.

The server 426 may also include a processor 442 or a processing unit to control operation of other devices in the server 426. The server 426 may also include I/O device 444. The I/O devices 444 may be similar to I/O devices 418 of communication devices 402. The server 426 may further include other devices 446, such as a monitor or the like to provide an interface along with the I/O devices 4 to the server 426. The server 426 may also include a hard disk drive 448. A system bus 450 may connect the different components of the server 426. A network interface 452 may couple the server 426 to the network 428 via the system bus 450.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of determining reliability of at least one DC motor system on a site, the method comprising:
   providing at least one DC condition forecaster, wherein the at least one DC condition forecaster is located on the site having the at least one DC motor system;
   acquiring historical motor data corresponding to the at least one DC motor system from at least one historical database; wherein the historical motor data comprises data representing an armature current; a field current; a field temperature; a bearing temperature; vibration; speed; commutator arcing; and combinations thereof;
   receiving operational indicator data from at least one sensor of the DC motor system;
   performing at least one reliability analysis based on a composite of reliability probability distributions corresponding to predetermined sub-populations of historical failure causes relating to the at least one DC motor system;
   developing at least one causal network for modeling reliability of a plurality of DC motor systems, including the at least one DC motor system, and assessing a combination of at least one DC motor system component based on the causal network;
   performing at least one integrated causal network and reliability analysis of the at least one DC motor system, wherein results from the at least one analysis are integrated with results from the step of assessing the at least one DC motor system component condition based on the at least one causal network to compute a quantitative value for an estimated time remaining before the failure; and
   generating at least one operability curve of the DC motor system based in part on the results of the step of performing the at least one integrated causal network and reliability analysis of the at least one DC motor system.

2. The method of claim 1, wherein the step of developing the causal network comprises utilizing fuzzy logic.

3. The method of claim 1, wherein the step of performing at least one integrated causal network and reliability analysis of the at least one DC motor system comprises modeling a failure rate of a system component using a Weibull probability distribution function.

4. The method of claim 1, wherein the step of receiving operational indicator data from at least one sensor of the at least one DC motor system further comprises transferring the operational indictor data to the historical database.

5. The method of claim 1 wherein the step of receiving operational indicator data from at least one sensor of the at least one DC motor system; the at least one sensor comprises at least one of a commutator sensor; a spark detection sensor; or an arcing detection sensor; and combinations thereof.

6. The method of claim 1, wherein the operational indictor data comprises data representing: an armature current; a field current; a field temperature; a bearing temperature; vibration; commutator arcing; speed; and combinations thereof.

7. The method of claim 1 further comprising the step of providing a graphical user interface that displays an estimated remaining time before failure of at least one DC motor system component.

8. A method of determining reliability of at least one DC motor system on a site, the method comprising:
   providing at least one DC condition forecaster, wherein the at least one DC condition forecaster is located on the site having the at least one DC motor system;
   acquiring historical motor data corresponding to the at least one DC motor system from at least one historical database; wherein the historical motor data comprises data representing an armature current; a field current; a field temperature; a bearing temperature; vibration; speed; commutator arcing; and combinations thereof;
   receiving operational indicator data from at least one sensor of the DC motor system;
   performing at least one reliability analysis based on a composite of reliability probability distributions corresponding to predetermined sub-populations of historical failure causes relating to the at least one DC motor system;
   developing at least one causal network for modeling reliability of a plurality of DC motor systems, including the at least one DC motor system, and assessing a combination of at least one DC motor system component based on the causal network; wherein the causal network utilizes fuzzy logic;
   performing at least one integrated causal network and reliability analysis of the at least one DC motor system, wherein results from the at least one analysis are integrated with results of assessing the at least one DC motor system component condition based on the at least one causal network to compute a quantitative value for an estimated time remaining before the failure; and modeling a failure rate of a system component using a Weibull probability distribution function; and
   generating at least one operability curve of the DC motor system based in part on the results of the step of performing the at least one integrated causal network and reliability analysis of the at least one DC motor system.

9. The method of claim 8, wherein the step of receiving operational indicator data from at least one sensor of the at least one DC motor system further comprises transferring the operational indictor data to the historical database.

10. The method of claim 8 wherein the step of receiving operational indicator data from at least one sensor of the at least one DC motor system; the at least one sensor comprises at least one of a commutator sensor; a spark detection sensor; or an arcing detection sensor; and combinations thereof.

11. The method of claim 8, wherein the operational indictor data comprises data representing: an armature current; a field current; a field temperature; a bearing temperature; vibration; commutator arcing; speed; and combinations thereof.

12. The method of claim 8 further comprising the step of providing a graphical user interface that displays an estimated remaining time before failure of at least one DC motor system component.

13. A system for determining reliability of at least one DC motor system on a site, the system comprising:
   at least one DC condition forecaster, wherein the at least one DC condition forecaster is located on the site having the at least one DC motor system;
   means for acquiring historical motor data corresponding to the at least one DC motor system from at least one historical database;
   at least one sensor of the DC motor system; wherein the at least one sensor provides operational indicator data;
   means for performing at least one reliability analysis based on a composite of reliability probability distributions corresponding to predetermined sub-populations of historical failure causes relating to the at least one DC motor system;
   means for developing at least one causal network for modeling reliability of a plurality of DC motor systems, including the at least one DC motor system;

means for assessing a combination of at least one DC motor system component based on the causal network; and wherein the at least one DC condition forecaster:
- performs at least one integrated causal network and reliability analysis of the at least one DC motor system, wherein results from the at least one analysis are integrated with results from the step of assessing the at least one DC motor system component condition based on the at least one causal network to compute a quantitative value for an estimated time remaining before the failure; and
- generates at least one operability curve of the at least one DC motor system based in part on the results of the step of performing the at least one integrated causal network and reliability analysis of the at least one DC motor system.

14. The system of claim 13, wherein the at least one DC motor condition forecaster comprises fuzzy logic.

15. The system of claim 13, wherein the DC motor condition forecaster comprises a Weibull probability distribution function.

16. The system of claim 13 further comprising means for transferring the operational indictor data to the historical database.

17. The system of claim 13 wherein the at least one sensor of the at least one DC motor system further comprises at least one of a commutator sensor; a spark detection sensor; or an arcing detection sensor; and combinations thereof.

18. The system of claim 13, wherein the operational indictor data comprises data representing: an armature current; a field current; a field temperature; a bearing temperature; vibration; commutator arcing; speed; and combinations thereof.

19. The system of claim 13 further comprising a graphical user interface that displays an estimated remaining time before failure of at least one DC motor system component.

20. The system of claim 13, wherein the historical motor data comprises data representing an armature current; a field current; a field temperature; a bearing temperature; vibration; commutator arcing; speed; and combinations thereof.

* * * * *